United States Patent
Plumettaz

(10) Patent No.: US 6,382,875 B1
(45) Date of Patent: May 7, 2002

(54) PROCESS FOR LAYING A TUBE IN A DUCT AND DEVICE FOR PRESSURIZING A TUBE DURING LAYING

(75) Inventor: Gerard Plumettaz, Bex (CH)

(73) Assignee: Plumettaz SA, Bex (CH)

(*) Notice: Subject to any disclaimer, the term of this patent is extended or adjusted under 35 U.S.C. 154(b) by 0 days.

(21) Appl. No.: 09/675,649

(22) Filed: Sep. 29, 2000

Related U.S. Application Data

(63) Continuation-in-part of application No. 09/533,099, filed on Mar. 22, 2000.

(51) Int. Cl.$^7$ .................................................. F16L 1/00
(52) U.S. Cl. ..................... 405/184.2; 29/428; 226/97.1
(58) Field of Search ........................... 29/234, 423, 433, 29/464, 455.1, 468, DIG. 63; 226/97.1; 254/134.4; 405/183.5, 184, 184.1, 184.2

(56) References Cited

U.S. PATENT DOCUMENTS

| | | | |
|---|---|---|---|
| 3,840,972 A | | 10/1974 | El Bindari |
| 5,180,009 A | * | 1/1993 | Sneed |
| 5,197,715 A | | 3/1993 | Griffioen |
| 5,813,658 A | | 9/1998 | Kaminski et al. |
| 5,884,384 A | | 3/1999 | Griffioen |
| 6,315,498 B1 | * | 11/2001 | Baugh et al. |

FOREIGN PATENT DOCUMENTS

| | | |
|---|---|---|
| EP | 0 445 858 A | 9/1991 |
| EP | 0 785 387 A | 7/1997 |

* cited by examiner

*Primary Examiner*—S. Thomas Hughes
*Assistant Examiner*—Eric Compton
(74) *Attorney, Agent, or Firm*—Oliff & Berridge PLC

(57) ABSTRACT

When a tube is laid in a duct by a blowing process, the extremity of the tube first introduced in the duct is fitted with an end cap fastened in an airtight fashion on said extremity and fitted with a valve suitable to control the pressure $P_{int}$ inside the tube, so that is always greater than the pressure $P_{ext}$ in the duct. In this matter, deformations or implosions of the tube are avoided.

7 Claims, 3 Drawing Sheets

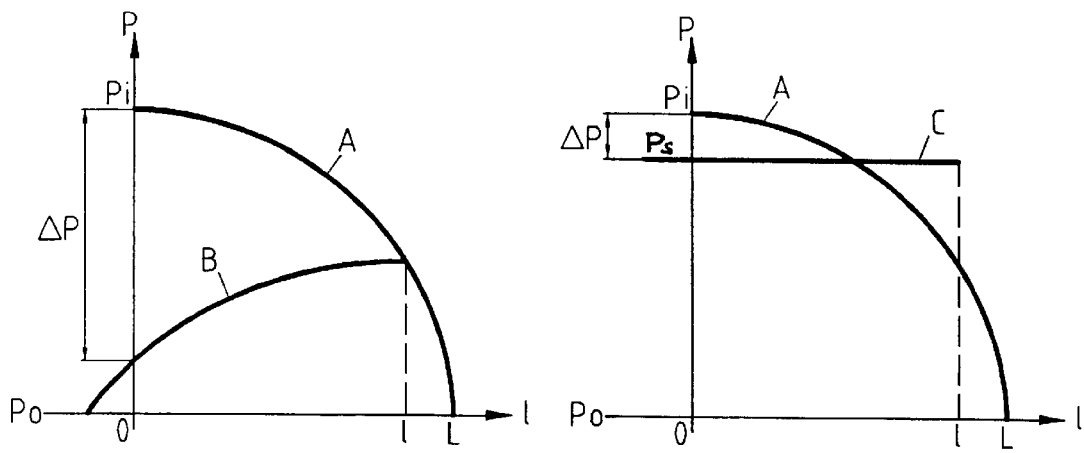
Fig 2
Prior Art
Fig 3
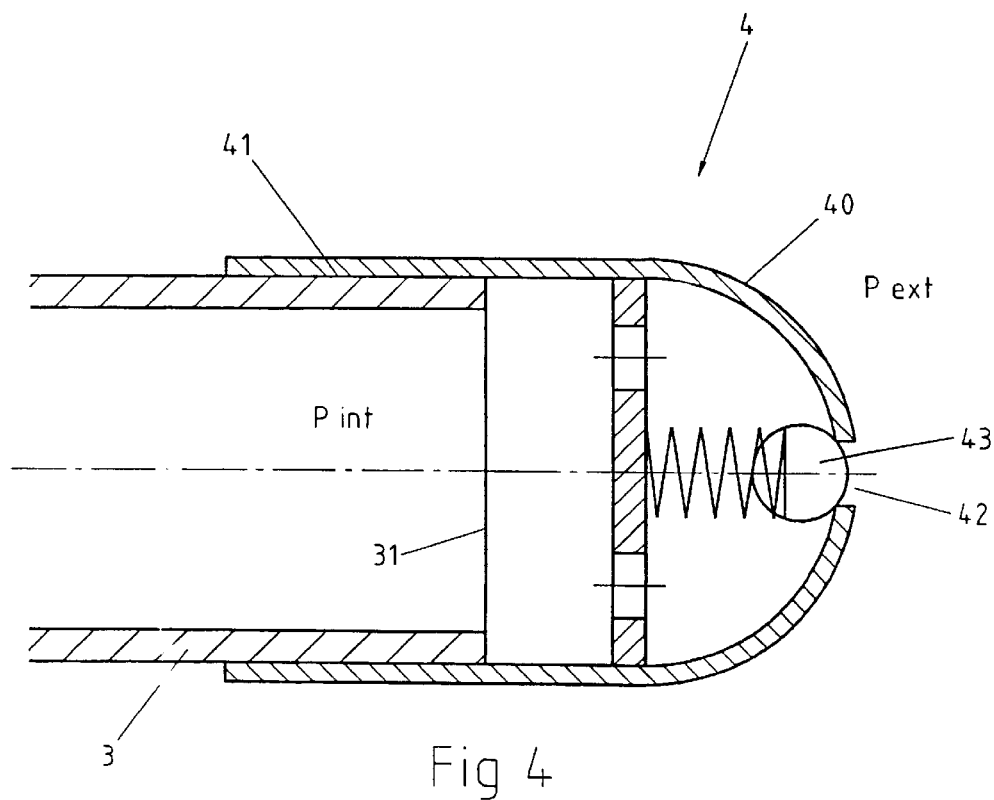
Fig 4

PROCESS FOR LAYING A TUBE IN A DUCT AND DEVICE FOR PRESSURIZING A TUBE DURING LAYING

INCORPORATION BY REFERENCE

This is a Continuation-in-Part of application Ser. No. 09/533,099 filed Mar. 22, 2000. The entire disclosure of the prior application is hereby incorporated by reference herein in its entirety.

The content of Application No. 99810307.01, filed Apr. 13, 1999, in Europe, is hereby incorporated by reference.

BACKGROUND OF THE INVENTION

1. Field of Invention

The present invention concerns the placing of tubes in underground ducts. In many already installed underground ducts, be they of metal or of synthetic material, it may be necessary to place one or several tubes, generally of a synthetic material, obviously having cross sections smaller than that of the ducts already installed. These tubes are destined for multiple uses, as for example for subsequently receiving an optical cable.

2. Description of Related Art

Various processes have been developed for placing such a tube in an already installed duct, which can already contain one or several other elements, such as cables or other conduits.

The work titled "Installation of Optical Cables in Ducts" by W. Griffioen, published by CIP-Gegevens Koninklijke Bibliotheek, Den Haag, (year), ISBN 90-72125-37-1, describes in detail notably a laying process by blowing.

It is also known that when a tube is subjected to a difference of pressure between the pressure surrounding it and that residing inside the tube, this tube resists better mechanically when the pressure inside the tube is superior to that surrounding it. In other words, a tube able to resist a determined internal superpressure is susceptible to deteriorate when this same value of superpressure is applied from the outside towards the inside of the tube.

As in the aforementioned laying process, a situation occurs where the external pressure of the tube is superior to its internal pressure, there can be risks of deformation and/or rupture of the tube depending on the pressure used at the inlet of the system and on the length of laying.

SUMMARY OF THE INVENTION

A first purpose of the invention is thus to propose a laying process that avoids this kind of disadvantages.

A second purpose of the invention is to propose a device that will avoid this kind of disadvantages when laying a tube in a duct.

The first aim is achieved by a process such as described in claim 1, whereas the second aim is achieved by a device as described in claim 6. The dependent claims concern particular embodiments or variants of the process or device according to the invention.

Two particular embodiments of a process and the corresponding devices according to the invention are described hereafter, this description making reference to the attached drawing comprising the figures.

BRIEF DESCRIPTION OF THE DRAWINGS

FIG. 2 shows the variation of the pressure p inside the already installed duct, this figure being partially taken from FIG. 5.2 of the aforementioned reference.

FIG. 3 is similar to the preceding but shows the improvement brought by the process according to the invention.

FIG. 4 shows schematically a preferred embodiment of the device for pressurizing the tube to be installed.

DETAILED DESCRIPTION OF PREFERRED EMBODIMENTS

Figure 1:
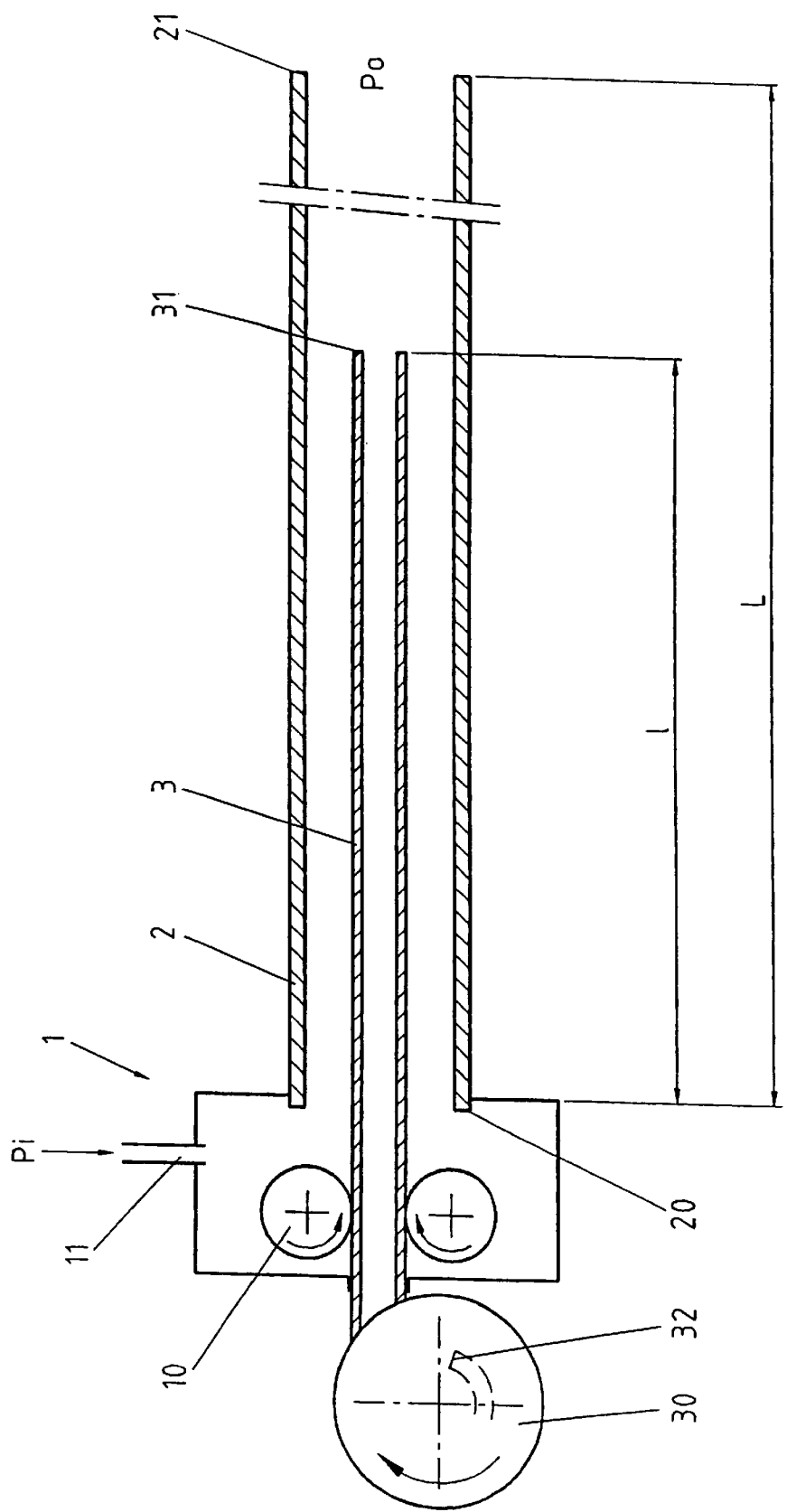
FIG. 1, which is taken from FIG. 6.1. of the aforementioned reference, makes it possible to understand the way in which the process of laying by blowing works.

FIG. 1 shows a blowing/pushing device 1, disposed at an extremity 20 of an installed underground dud 2 of length L. The opposite extremity 21 of the underground duct 2 is open to the atmospheric pressure $P_o$. A tube 3, unwound from a coil 30, is being laid in duct 2, its extremity 31 being at a distance I relative to the extremity 20 of duct 2, its other extremity 32 being still on coil 30. The blowing/pushing device 1 comprises notably mechanical pushing means 10, for example a pair of driving wheels as represented in the figure, as well as blowing means 11, comprising for example a supply of compressed air as represented. The blowing/pushing device 1 is connected in an airtight fashion to duct 2 and the entrance of tube 3 in said device is also made airtight, so that the air pressure $P_i$ introduced into the device is transmitted with minimum loss into duct 2. This pressure $P_i$, of the order of 10 to 15 bars, enables tube 3 to float in duct 2 and to be pushed along said duct, the mechanical pushing means 10 assisting this forward motion, as explained in the aforementioned reference.

The representation of the pressure p along duct 2 is given by curve A in FIG. 2. It is demonstrated in the aforementioned reference that this curve is parabolic, passing for I=0 from the value $P_i$, which corresponds to the pressure introduced into the system by the blowing/pushing device 1, to the atmospheric pressure $P_o$ for I=L, the extremity 21 of duct 2 being at atmospheric pressure.

With reference to FIG. 1, it can be seen that for the known laying processes, the extremity 31 of the tube 3 being laid is open, i.e. the pressure p which resides at the extremity of this tube 3 corresponds to the pressure p at this place of duct 2, this pressure being generally greater than $P_o$. As the opposite extremity 32 of the tube 3 is also open, there is an air flow inside tube 3, from the extremity 31 towards the extremity 32. The graphical representation of the pressure variation inside tube 3 is indicated by curve B of FIG. 2, with the length of tube 3 corresponding to the length L of duct 2.

It can be seen that near the extremity 20 of duct 2 through which tube 3 is inserted, there is a difference of pressure ΔP between the inside and the outside of tube 3, the value ΔP corresponding to the difference between the curve A and the curve B, respectively between $P_i$ and the value of the curve B for I=0.

When the extremity 31 of tube 3 is close to extremity 21, the value ΔP increases considerably and can easily exceed the maximum value of resistance to the external pressure of tube 3. When a tube 3 is laid as described here above, one thus often has an implosion, a tearing or an irreversible deformation of tube 3 near the entrance extremity 20 of duct 2.

Tests tending to simply block one or the other or both extremities 31, 32 of tube 3 cannot resolve the problem since there will always be an area of tube 3 where ΔP will be superior to the allowed value.

According to a first variant of the process, before tube 3 is unwound, both extremities 31 and 32 of the tube are airtight closed and sealed by known means, plug, sealing or other, one of said extremities being fitted with an air check valve. Tube 3 is then put under air pressure by means of the compressor able to supply pressure $P_i$ to the blowing/pushing device 1 mentioned above. Tube 3 is thus inflated to a pressure $P_s$, inferior or equal to $P_i$, this pressure remaining constant along the entire length of tube 3 and during its entire laying process, as represented by curve C in FIG. 3. The value $\Delta P$ representing the superpressure applied from the outside towards the inside of tube 3 can be made as small as wished by bringing $P_s$ close to $P_i$, i.e. by first inflating tube 3 to a pressure very close or equal to $P_i$, so that the value $\Delta P$ is always lower than the value of the external superpressure tolerated by tube 3. In this way, a superpressure applied from the outside towards the inside, that is a superpressure which the tube cannot withstand, is in fact transformed into a superpressure applied from the inside towards the outside, that is a superpressure which the tube can withstand.

FIG. 4 shows schematically a valve device 4 making it possible to operate according to a preferred variant of the preceding process, without using auxiliary means for inflating the tube 3 as the previously mentioned compressor. An end cap 40, of synthetic or metallic material, is fastened in an airtight fashion, for example by gluing, crimping, welding or any other means 41 on the extremity 31 of tube 3. A port 42, controlled by a check valve 43 represented here in the shape of a ball pushed by a spring, can make the inside of the end cap 40 respectively the extremity 31 of tube 3, communicate with the ambient atmosphere when the pressure $P_{ext}$ of the ambient atmosphere is greater than pressure $P_{int}$ at the extremity 31, i.e. the check valve 43 is designed to open the port 42 when the external pressure $P_{ext}$ is greater than $P_{int}$ and to close said port when $P_{ext}$ is lower than $P_{int}$ Simultaneously, as previously described, the other extremity 32 of tube 3 is blocked.

Thus, before beginning the laying of tube 3 in duct 2, the internal pressure in tube 3 generally equals the atmospheric pressure $P_o$. When the extremity 31 of tube 3, fitted with the valve device 4, the extremity 32 on the coil 30 being blocked, is inserted into the blowing/pushing device 1, in which the pressure settles at the value $P_i$, the check valve 43 is automatically operated, so that the tube 3 is filled with air until the internal pressure settles at the value $P_i$. In fact, and if tube 3 is not stopped in the device 1 or in the beginning of duct 2, the pressure established inside tube 3 is slightly lower than $P_i$, since the extremity 31 has advanced into duct 2 and the balance of pressures is established for a value of I greater than 0, respectively for a value p slightly lower than $P_i$, as for example $P_s$ in FIG. 3. Since further on the trajectory covered by the extremity 31 in duct 2 the value of the pressure $P_{int}$ inside tube 3 is always greater than $P_{ext}$, the port 42 will remain closed.

During the entire laying of tube 3 in duct 2, the internal pressure $P_{int}$ in tube 3 will thus remain constant, being equal or slightly inferior to $P_i$ as represented also by curve C of FIG. 3. Thus, the situation in which the pressure $P_{ext}$ would be superior to $P_{int}$, which could lead to the deterioration of tube 3, will no longer occur.

According to the two described variants of the process, when tube 3 is entirely laid in duct 2, it is sufficient to purge tube 3 by emptying it of the highly compressed air it contains, either by ailing mechanically on check valve 43, or by opening a valve not represented, or by removing the end cap 40 or the plug placed on the other extremity. When the plug and the end cap have been removed, the empty tube 3 is readily available, for example for pulling a new cable into duct 2, for example an optical cable.

The means applied here to guarantee the integrity of tube 3 during its laying are extremely simple and not very expensive, they require in particular no adaptation of the blowing/pushing device 1 nor any additional laying material with the exception of a valve device 4.

This valve device 4 can be of a very simple design; as already mentioned, the end cap 40 can be fitted in an airtight fashion in different ways on the extremity 31 of tube 3. If the fastening mode is permanent, such as welding or gluing, or results in a deformation of the cap end, such as during crimping for instance, the device 4 will be used only once. On the contrary, if the fastening means for the device 4 on the extremity 31 are reusable, the device can be used for multiple laying operations. FIG. 4 shows a particular type of valve 43 permanently fastened on the cap end 40. Advantageously, a valve of a known type will be used, for example an air chamber valve or vehicle wheel valve, mounted permanently or removably on the end cap 40.

Figure 5:
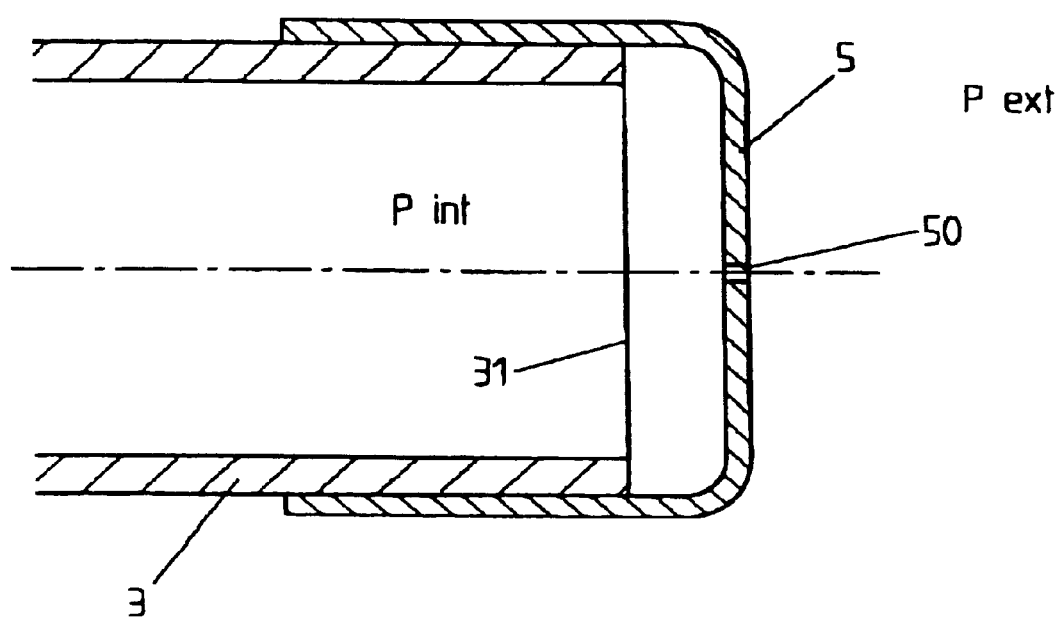
FIG. 5 shows schematically another embodiment of a device for pressuring the tube to be installed.

According to a simplified embodiment shown in FIG. 5, the extremity 31 of the tube 3 comprises a cap end 5 provided with a calibrated opening 50 of small section. As for the preceding embodiments, the other extremity 32 of the tube 3 is closed.

The section of the opening 50 is determined so as to allow the outer pressure $P_{ext}$ and the inner pressure $P_{int}$ to be balanced, this balancing being realized only at very low speed.

Thus, before the laying operation of the tube 3 in the duct 2 begins, the extremity 32 of the tube 3 is closed whereas the extremity 31 is provided with the cap end 5 comprising the opening 50. The pressure inside the tube 3 is then equal to the atmospheric pressure and is uniformly distributed along tube.3.

The extremity 31 of the tube 3 is then inserted in the pushing device 10 under pressure $P_i$ attached at the extremity 20 of the duct 2. Since the pressure $P_i$ is greater than the pressure $P_{int}$, residing inside the tube 3, this latter pressure pint increases slowly, potentially reaching an equilibrium with $P_i$ in the case where the tube 3 is left for a sufficient amount of time in this position.

During the laying of the tube 3 in the duct 2, the balance of the pressures $P_{ext}$ and $P_{int}$ is established on a first portion of length of the duct 2, in the same manner as with the preceding process using a valve. On this first portion of length where $P_i$ is greater than $P_{int}$ increases slowly during the laying.

On a second portion of length of laying, where $P_i$ is then lower than $P_{int}$, the pressure $P_{int}$ decreases slowly, sufficiently slowly so that, at the end of the laying operation, the difference between $P_i$ and $P_{int}$ is sufficiently small to prevent the tube 3 from imploding because of this difference of pressure.

As previously, the cap end 5 is metallic or of synthetic material, attached airtight to the extremity 31 of the tube 3 through gluing, crimping or any adequate means. Preferably, the cap end 5 is used only for a single laying operation. Thanks to the very easy design and low-cost production of the cap end 5, the laying process is particularly cost-effective.

Such a process, according to one or the other of the described variants, ensures a constant pressure $P_s$, or a pressure $P_s$ with a very small variation, along the entire length of the tube 3 and during the entire laying operation. Therefore, the installation speed or any possible interruptions during the laying operation have no influence on the process.

While the invention has been described with reference to preferred embodiments thereof, it is to be understood that the invention is not limited to the preferred embodiments or constructions. On the contrary, the invention is intended to cover various modifications and equivalent arrangements. In addition, while the various elements of the invention are shown in various combinations and configurations which are exemplary, other combinations and configurations, including more, less or only a single element, are also within the spirit and scope of the invention.

What is claimed is:

1. A process for laying a hollow tube in a duct comprising introducing the tube into a duct and, injecting a fluid at a first pressure ($P_i$) in a first extremity of the duct, the other extremity of the duct being at a second pressure ($P_o$) lower than said first pressure, wherein the hollow tube comprises a device able to maintain a difference of pressure ($\Delta P$) between said first pressure ($P_i$) and a pressure ($P_s$, $P_{int}$) inside the tube, lower than a superpressure tolerated by the tube.

2. A process according to claim 1 wherein the pressure ($P_s$, $P_{int}$) inside the tube is constant.

3. A process according to claim 1, wherein the pressure ($P_s$, $P_{int}$) inside the tube is obtained by pressurizing the tube by injecting a fluid at a first pressure ($P_i$).

4. A process according to claim 1, wherein said device comprises a valve fitted on the extremity of the tube first introduced in the duct, said valve opening only when a pressure($P_{ext}$) outside said extremity is greater than the pressure ($P_s$, $P_{int}$) inside the tube.

5. A process according to claim 4, wherein the valve opens only when the extremity of the tube fitted with said valve is near the first extremity of the duct.

6. A process according to claim 1, wherein the other extremity of the tube is closed.

7. A process according to claim 1, wherein said device comprises an end cap comprising a calibrated opening.

* * * * *